INVENTOR.
ROBERT W. McCLENNY,
BY
Berman, Davidson & Berman
ATTORNEYS.

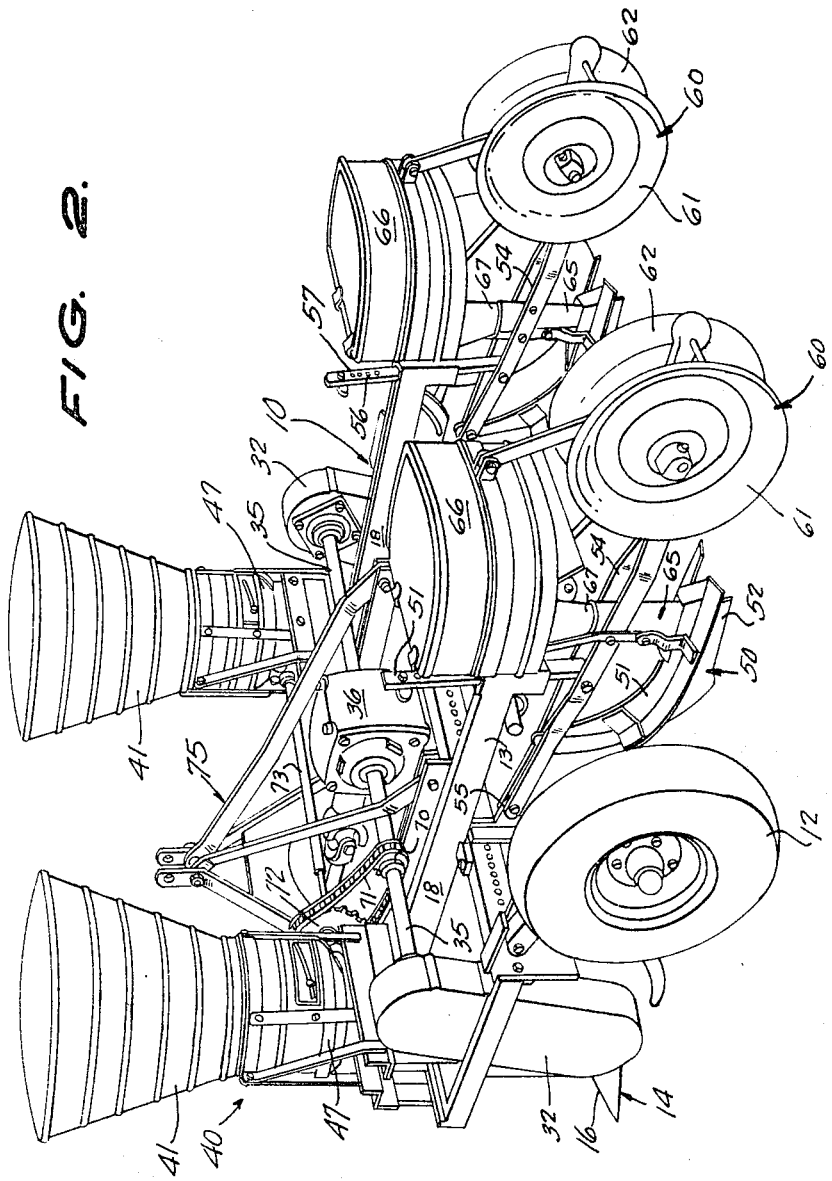

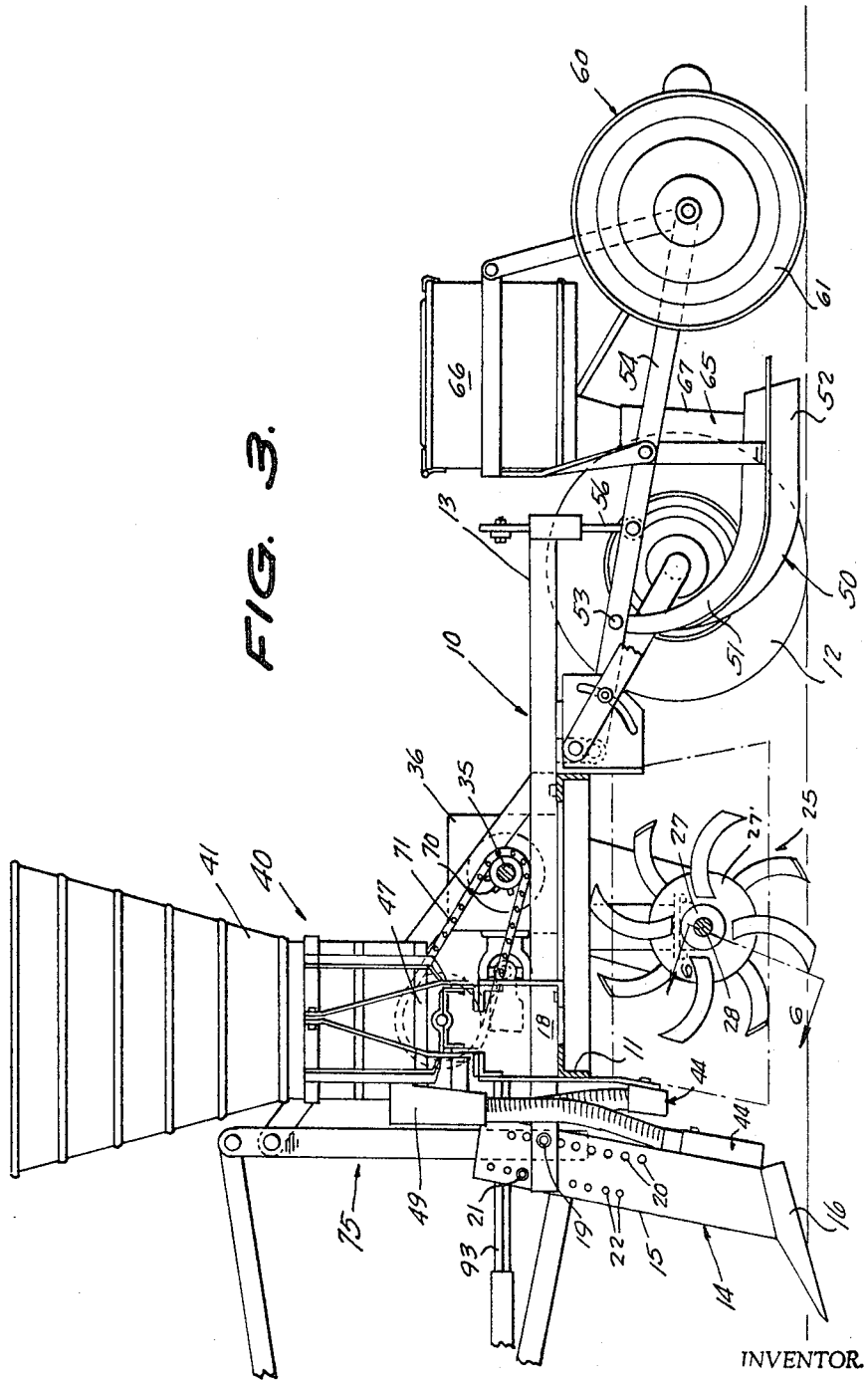

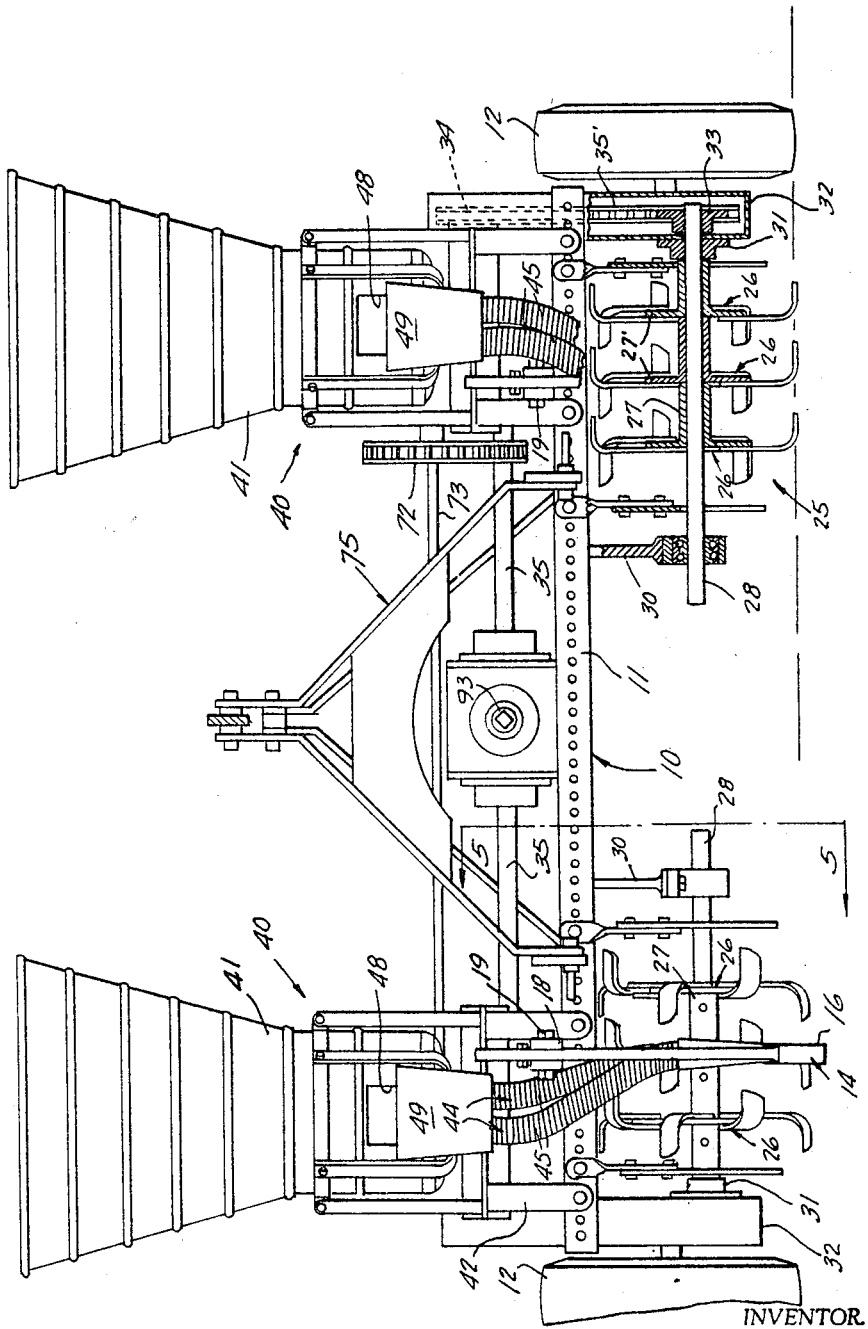

Aug. 27, 1968     R. W. McCLENNY     3,398,707
APPARATUS FOR WORKING, TREATING AND PLANTING SOIL
Original Filed June 26, 1964
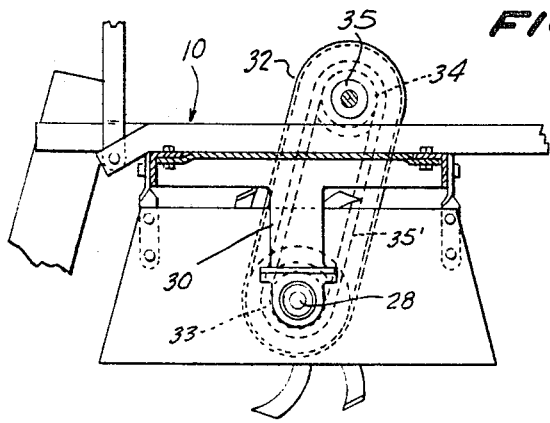
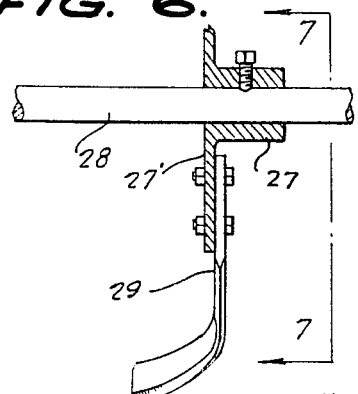
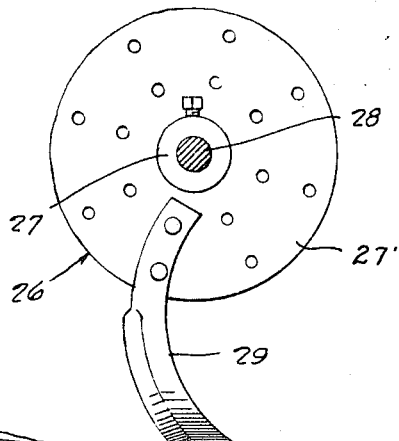
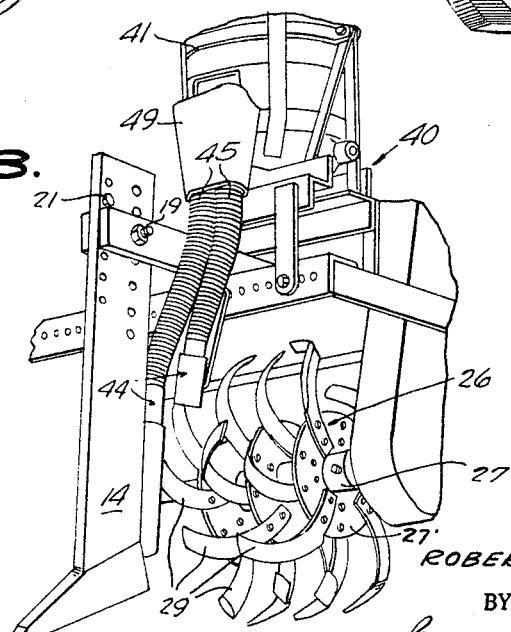
INVENTOR.
ROBERT W. McCLENNY.
BY
*Berman, Davidson & Berman*
ATTORNEYS.

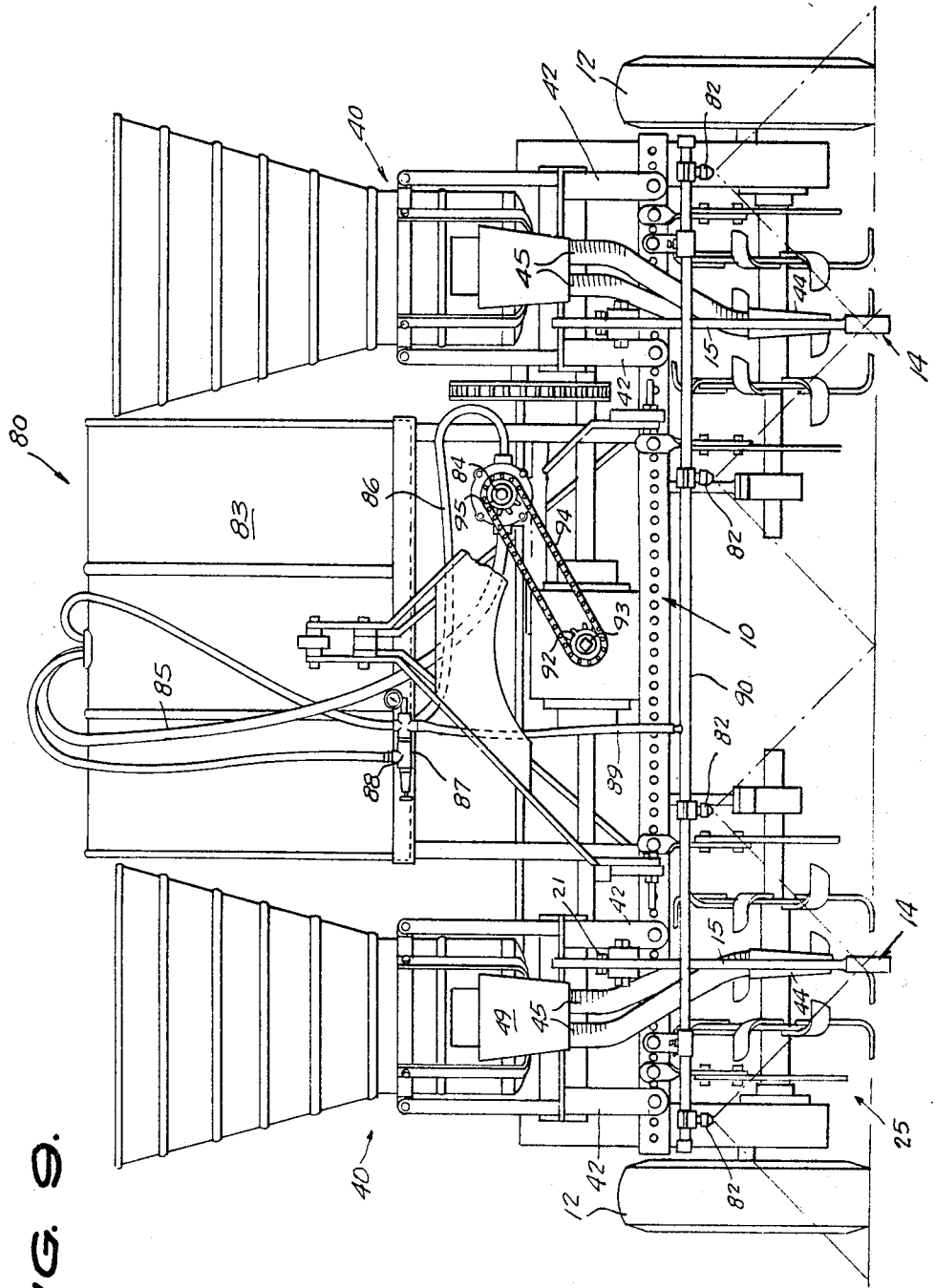

United States Patent Office 3,398,707
Patented Aug. 27, 1968

3,398,707
APPARATUS FOR WORKING, TREATING AND PLANTING SOIL
Robert W. McClenny, P.O. Box 1206,
Suffolk, Va. 23434
Continuation of abandoned application Ser. No. 378,388, June 26, 1964. This application Aug. 12, 1966, Ser. No. 572,139
1 Claim. (Cl. 111—85)

ABSTRACT OF THE DISCLOSURE

An attachment for furrowing, fertilizing, cultivating and planting on a single pass, said attachment having a main frame on which are mounted, from front to back, plows, fertilizer delivery means, and rotary cultivator means; said frame having a three-point hitch for connection of the main frame to a tractor; a drive system on said main frame for said fertilizer delivery means and said rotary cultivator means with a connection to the power take-off of said tractor; an auxiliary frame pivotally mounted on the rear of said main frame with furrowing, planting and seed covering means mounted on said auxiliary frame.

---

This application is a continuation-application of application Ser. No. 378,388, filed June 26, 1964 (now abandoned), and relates to an apparatus for working, treating and planting soil.

An object of the invention is to provide an apparatus which is capable of furrowing the area of soil to be planted, of working the furrowed area, and of treating the furrowed area while the furrowed area is being worked prior to planting of the treated area.

Another object of the present invention is to provide an apparatus which enables the soil to be planted to be worked and treated prior to planting, followed by planting of such areas as the apparatus travels in a continuous manner over the ground surface.

A further object of the present invention is to provide an apparatus which is capable of applying a weed-destroying agent to the soil to be planted, followed by working and treating such applied areas and by planting such treated areas, and which performs such operations in a continuous manner as it travels over the ground surface.

A still further object of the present invention is to provide an apparatus which readily adapts itself for attachment to and for operative connection to a towing vehicle.

Other objects and advantages of the present invention will become apparent from the following description taken in conjunction with the accompanying drawings, in which:

FIGURE 2 is a rear perspective view of the apparatus according to the present invention.

FIGURE 3 is a longitudinal sectional view taken through the apparatus according to the present invention.

FIGURE 4 is a front elevational view taken from the left-hand side of the apparatus shown in FIGURE 3, with parts broken away and in section.

FIGURE 5 is a fragmentary sectional view taken on the line 5—5 of FIGURE 4.

FIGURE 6 is a fragmentary view of one of the soil-working tines attached to the rotary soil-working element.

FIGURE 7 is a sectional view taken on the line 7—7 of FIGURE 6.

FIGURE 8 is a perspective view of one of the soil-working and treating units of the apparatus according to the present invention.

FIGURE 9 is a front elevational view taken from the left-hand side of the apparatus shown in FIGURE 3, but with the weed-killing solution containing tank and the associated dispensing mechanism.

Figure 1:
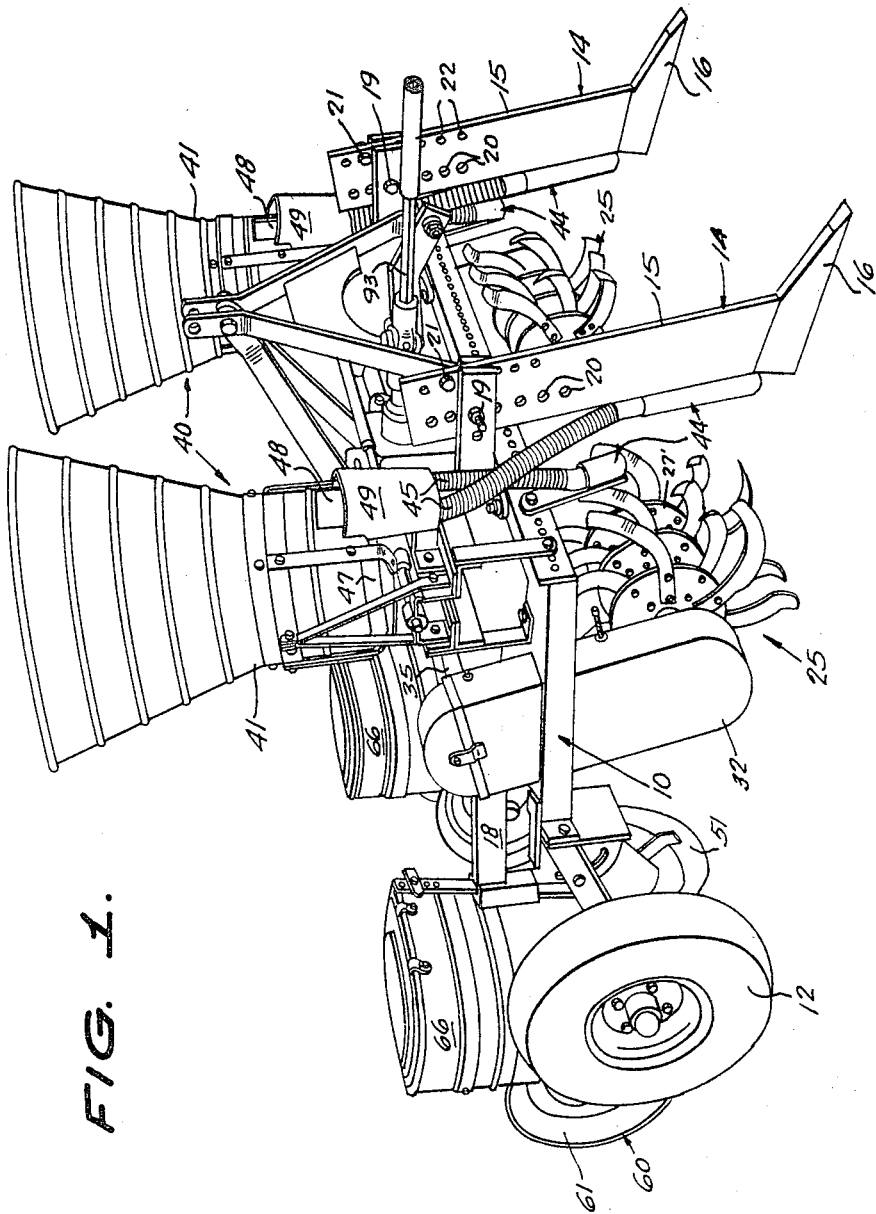
FIGURE 1 is a front perspective view of the apparatus according to the present invention.

Referring to the drawings, the numeral 10 indicates a mobile frame which has a front end 11 and a rear end 13 and which is supported by laterally-spaced ground-engaging wheels 12, the frame being adapted to travel over a ground surface. At least two laterally-spaced furrow forming elements 14 are disposed so as to extend forwardly from the front end 11 of the frame 10 and are carried by the frame 10. Specifically, each furrow forming element 14 takes the form of an upright 15 provided on its lower end with a plowshare 16, the upright 15 being adjustably-connected to the adjacent forward ends of a pair of longitudinally-extending beams 18 surrounding the frame 10 and carried by the latter, by means of a bolt and nut assembly 19 extending through the beam 18 and one of the selected holes 20 provided in the upright 15. Another bolt and nut assembly 21 extends through a selected one of a row of holes 22 also provided in the upright 15, the bolt and nut assembly 21 serving to retain the upright 15 and its dependent plowshare 16 against swinging movement toward the rear end 13 of the frame 10.

A rotary soil-working member 25 is located behind and spaced from each of the furrow forming elements 14 and is of a width to extend beyond the opposite sides of the adjacent furrow forming element 14. Specifically, the rotary soil-working member embodies a plurality of wheels 26 arranged in side-by-side spaced relation with each wheel 26 having a plurality of bowed tines 29 projecting radially from the periphery thereof, the tines projecting radially from opposite sides of each wheel with a tine 29 on one of the sides of the wheel located between adjacent tines on the other or opposite side of the wheel, the free end portions of the tines on the one side of each of the wheels being curved outwardly, and the free end portions of the tines on the other or opposite side of each of the wheels being curved inwardly. Specifically, each wheel 26 of the rotary soil-working member 25 comprises a hub 27 circumposed about a driven shaft 28 and connected to the latter for rotation therewith. Carried by each hub 27 is a disc 27', and projecting from the periphery of the disc 27' are a plurality of bowed tines 29. The tines 29 are arranged so that they project radially from opposite sides of the disc 27' with a tine 29 on one of the sides of the disc 27' located between adjacent tines 29 on the other or opposite sides of the disc 27', the free end portions of the tines 29 which project radially from one of the sides of the disc 27' being outwardly-curved, and the free end portions of the tines 29 which project radially from the other or opposite sides of the disc 27' being inwardly-curved, as clearly shown in FIGURE 4. The width of the plurality of wheels 26 on the driven shaft 28 of each soil-working member 25 is such as to extend beyond the opposite sides of the adjacent furrow forming element. Each driven shaft 28 is supported at one end from the frame 10 by means of a pedestal bearing 30 and supported at the opposite end by means of a bearing 31 provided on a chain guard 32 depending from the frame 10. Each of the driven shafts 28 carries a sprocket 33 which is located contiguous to the bearing 31, the sprocket 33 being drivingly-connected to another sprocket 34 on a drive shaft 35 by means of a chain 35' in meshing engagement with the sprockets 33 and 34. The drive shaft 35 projects from opposite sides of a gear box 36 which is adapted to be drivingly-connected to a power take-off of a towing vehicle, not shown.

A soil-treating agent means 40 is disposed in the region between each furrow forming element 14 and the adjacent soil-working member 25 and is carried by the frame 10. Specifically, each means embodies a hopper 41 adapted to contain a supply of treating agent, such as fertilizer, the hopper being supported upon the frame 10 by means of legs 42 rising from and fixedly-attached to the frame 10. Bridging the discharge end of each of the hoppers 41 is a rotatable dispensing member 47, which is drivingly-connected to the drive shaft 35 by means to be subsequently described. Each hopper 41 is provided with an opening 48 in the front thereof contiguous to the adjacent dispensing member 47 which is in communication with a funnel 49. Connected in communication with the interior of each of the hoppers 41 through the opening 48 and funnel 49 are a pair of outlets 44, one of the outlets discharging below the soil in the aforesaid region, and the other of the outlets discharging above the soil in the aforesaid region. Each of the outlets 44 takes the form of a flexible tube 45 with one of the tubes having its outlet discharging below the soil in the aforesaid region, and the other of the tubes discharging above the soil in the aforesaid region, as clearly shown in FIGURES 1 and 3.

A second furrow forming element 50 is located behind and spaced from each of the rotary soil-working members 25 and is carried by the frame 10, each of the furrow forming elements 50 being in alignment with the furrow forming element 14 adjacent each rotary soil-working member 25. Specifically, the furrow forming element 50 comprises an upstanding bowed plate 51 having the lower end portion terminating in a plowshare tread 52, the upper end of the plate 51 being pivotally-connected as at 53 to an adjacent bifurcated arm 54. Each of the arms 54 has one end 55 pivotally-connected to the frame 10 and has the intermediate portion adjustably-connected to an upstanding bar 56 slidably supported in the rear end 13 of the frame 10, the bar 56 being provided with a row of holes 57 in one of which is supported a stop member 58 for retaining the other end of the arm 54 in the desired position with respect to the ground surface. It is to be noted that the other end of each of the arms 54 carries a furrow covering device 60 which comprises a freely rotatable roller 61 provided with a groove 62 extending about its periphery, the roller serving to cover over the freshly planted furrow.

A seed-dispensing means 65 is provided which extends through the bifurcation in each of the arms 54, the seed-dispensing means comprising a hopper 66 which is adapted to contain a supply of seed to be planted and has a dispensing chute 67 which discharges below the soil in the area of each of the second furrow forming elements 50. Each of the hoppers 66 has a conventional seed-dispensing member, not shown, and which is operable to discharge seed from the hopper into the adjacent chute 67 by the rotational movement of the adjacent roller 61, by conventional means, not shown.

The rotatable dispensing member in each of the hoppers 41 is drivingly-connected to the drive shaft 35 by means of a sprocket 70, drive chain 71, and sprocket 72 carried by a driven shaft 73 extending between and connected to both of the members 47.

The frame 10 carries a conventional three-point hitch 75 for attachment to a towing vehicle.

The frame 10 may, if so desired, have mounted thereon a weed-destroying means. Referring to FIGURE 9 it will be seen that a weed-destroying means is indicated generally by the numeral 80 and is located along the front end 11 of the frame 10 and is carried by the frame 10, the said means having spaced outlets 82 arranged so as to discharge above the soil within the area of and between the furrow forming element 14. Specifically, this means embodies a tank 83 adapted to contain a supply of weed-destroying liquid, a pump 84 exteriorly of the tank and supported on the frame 10, a conduit 85 extending from the interior of the tank 83 to the pump 84, a conduit 86 extending from the pump 84 to a distributor 87, the distributor being provided with a needle control valve 88 for controlling the discharge of liquid or solution from the distributor 87. A conduit 89 connects the distributor 87 to a manifold 90, the manifold being located so as to extend along the entire front end 11 of the frame 10. It is to be noted that the manifold 90 has the spaced outlets 82 in the form of sprayheads which discharge above and toward the ground surface. The pump 84 is drivingly-connected to the power take-off, not shown, of a towing vehicle, by means of a sprocket 92 on a shaft 93 projecting from the power take-off of the towing vehicle, not shown, a drive chain 94, and a sprocket 95 on the pump 84.

In operation of the apparatus according to FIGURE 1, the hoppers 41 are each filled with a treating agent, such as fertilizer, the shaft 93 connected to the power take-off of a towing vehicle (not shown), and the three-way hitch 75 is attached to the towing vehicle, whereupon the apparatus is drawn forwardly by the towing vehicle over a ground surface to be planted. As the apparatus moves over the ground surface, in turn, the two furrow forming elements 14 form in the ground surface two laterally-disposed furrows, the adjacent rotary soil-working member 25 chopping up the soil and turf on opposite sides of the adjacent furrow and in the area of the freshly made furrow with the adjacent outlets 44 of the soil-treating agent means 40 discharging the treating agent below and above the soil in the region between the rotary soil-working members 25 and the furrow forming elements 14. It is to be noted that as the apparatus moves over the ground surface the rotary dispensing members 47 are operated by the drive shaft 35 which is driven by the power take-off, thereby feeding the treating agent or fertilizer to the openings 48 into the funnels 49 and thence into the outlets 44.

Following the working up and treating of the regions of the soil between the furrow forming elements 14 and the rotary soil-working members 25 the furrow forming elements 50 form, as the apparatus continues to move over the ground surface, two new furrows in such soil, and seed is fed through the chutes 67 and are deposited under the surface of the newly formed furrows followed by the furrow covering device 60 covering over the freshly planted furrows. Of course, as the covering devices 60 are rolled over the ground surface the conventional seed-dispensing members in the hopper 66 are operated to discharge seed from the hoppers into the chute 67.

When the form of the apparatus of FIGURE 9 is employed, the weed-destroying liquid contained in the tank 83 is caused to flow out of the sprayheads 82 by means of the pump 84 and discharged upon the ground surface in the area of the furrow forming elements 14.

The thus described apparatus possesses the novel advantage in that it is possible to plant a crop in a field of pastureland, in a field having a green cover crop of rye, clover, or similar grain or in a field having only standing stubble, by simply moving this apparatus on to either of such fields, and cause such apparatus to operate. The operation of such apparatus in either of the aforesaid types of fields results in the first furrowing element cutting the furrow followed by the rotary soil-working member 25 chopping up the turf and soil and thoroughly intermixing with the chopped turf and soil the fertilizer introduced by the plowshare 16 above and below the surface of the soil. Heretofore, it has been necessary to pre-treat such fields by first subjecting them to two operations, namely, a plowing operation followed by a harrowing operation.

It is important to make mention of the fact that the employment of an outlet discharging above and an outlet discharging below the soil possesses the novel advantage that the under roots of the plant are intermingled with and are embedded in the soil treated by the outlet discharging below the soil and the top roots of the plant are intermingled with and embedded in the soil treated with the outlet discharging above the soil, thereby enabling all of the roots of the plant to be nourished by fertilizer-treated soil. With the soil treated only by an outlet discharging above the ground, the top roots of the plant are only nourished by the fertilizer-impregnated soil adjacent the top of the soil, and with the outlet discharging below the ground the under roots of the plant are only nourished by the fertilizer-impregnated soil well below the top or surface of the soil.

What is claimed is:

1. An attachment for furrowing, fertilizing, cultivating and planting on a single pass, said attachment having a main frame on which are mounted, in series from front to back, plows, fertilizer delivery means following the path of said plows, and toothed rotary cultivator means, the teeth of said cultivator means having portions extending both radially and circumferentially and extending laterally on both sides of said fertilizer delivery means; said frame having a three-point hitch for connection of the main frame for said fertilizer delivery means and said rotary cultivator means with a connection to the power take-off of said tractor; an auxiliary frame pivotally mounted on the rear of said main frame with furrowing, planting and seed covering means mounted on said auxiliary frame.

References Cited

UNITED STATES PATENTS

| | | | |
|---|---|---|---|
| 2,734,439 | 2/1956 | Padrick | 111—7 XR |
| 1,845,936 | 2/1932 | Rude | 172—556 |
| 3,110,275 | 11/1963 | Bonney | 111—7 XR |
| 3,121,973 | 2/1964 | Phillips et al. | 111—7 XR |
| 3,128,831 | 4/1964 | Arndt | 172—123 |
| 3,151,685 | 10/1964 | Field | 172—556 |
| 3,170,421 | 2/1965 | Norris et al. | 111—1 |

ROBERT E. BAGWILL, *Primary Examiner.*